（12）# United States Patent
Romero Vasquez

(10) Patent No.: US 12,496,176 B1
(45) Date of Patent: Dec. 16, 2025

(54) METHOD FOR MITIGATING PULPAL PAIN IN SYMPTOMATIC PATIENTS AND PREVENTING UNNECESSARY ENDODONTIC TREATMENT

(71) Applicant: Maria I. Romero Vasquez, Alexandria, VA (US)

(72) Inventor: Maria I. Romero Vasquez, Alexandria, VA (US)

( * ) Notice: Subject to any disclaimer, the term of this patent is extended or adjusted under 35 U.S.C. 154(b) by 11 days.

(21) Appl. No.: 19/171,373

(22) Filed: Apr. 7, 2025

(51) Int. Cl.
| | |
|---|---|
| *A61C 19/08* | (2006.01) |
| *A61K 6/20* | (2020.01) |
| *A61K 6/836* | (2020.01) |
| *A61K 31/085* | (2006.01) |
| *A61K 33/30* | (2006.01) |

(52) U.S. Cl.
CPC ........... *A61C 19/08* (2013.01); *A61K 6/20* (2020.01); *A61K 6/836* (2020.01); *A61K 31/085* (2013.01); *A61K 33/30* (2013.01)

(58) Field of Classification Search
CPC .... A61C 5/00; A61C 5/20; A61C 5/40; A61C 5/42; A61C 19/08; A61K 6/20; A61K 6/836
See application file for complete search history.

(56) References Cited

U.S. PATENT DOCUMENTS

| | | | | |
|---|---|---|---|---|
| 2,413,294 | A * | 12/1946 | Curtis ................... | A61K 6/887 106/35 |
| 2,937,099 | A * | 5/1960 | Kutscher ................ | A61K 6/891 106/35 |
| 2023/0000590 | A1 * | 1/2023 | Al Hezaimi ............ | A61C 5/20 |

FOREIGN PATENT DOCUMENTS

BY      21097 C1 *    6/2017

OTHER PUBLICATIONS

"Eugenol", Wikipedia, May 20, 2025 [online], [retrieved on May 29, 2025]. Retrieved from the internet <URL: https://en.wikipedia.org/w/index.php?title=Eugenol&oldid=1291245772> (Year: 2025).*
"Zinc oxide eugenol", Wikipedia, May 24, 2025 [online], [retrieved on Jul. 24, 2025]. Retrieved from the internet <URL: https://en.wikipedia.org/wiki/Zinc_oxide_eugenol> (Year: 2025).*

* cited by examiner

*Primary Examiner* — Sophie Hon

(57) ABSTRACT

The present invention provides a structured, biologically based clinical method for mitigating symptomatic pulpal conditions and preventing unnecessary endodontic treatment. Targeted at teeth with vital pulps and reversible inflammation, the protocol combines selective caries removal, pulp protection using calcium hydroxide or MTA, a sedative zinc oxide-eugenol base, and provisional sealing with moisture-setting cement. The method includes diagnostic, therapeutic, and follow-up steps, with one-week, one-month, and three-month evaluations to assess healing. If symptoms persist, root canal therapy is initiated; if asymptomatic, definitive restoration is performed. Annual monitoring ensures long-term pulpal stability. This reproducible approach prioritizes pain control, infection management, pulp preservation, and tooth longevity. It provides an evidence-based alternative to conventional endodontics, reducing overtreatment while supporting functional and biological integrity of the dental organ.

3 Claims, 1 Drawing Sheet

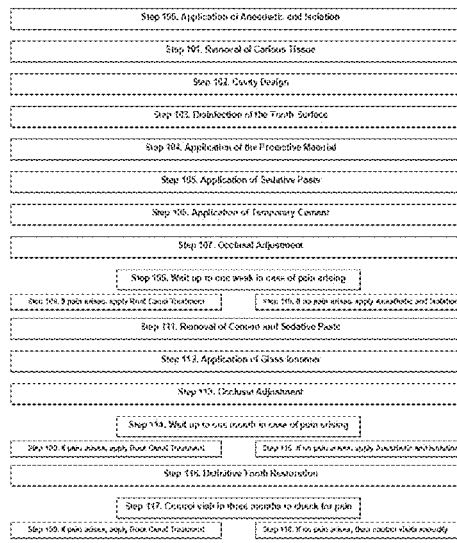

- Step 100. Application of Anesthetic and Isolation
- Step 101. Removal of Carious Tissue
- Step 102. Cavity Design
- Step 103. Disinfection of the Tooth Surface
- Step 104. Application of the Protective Material
- Step 105. Application of Sedative Paste
- Step 106. Application of Temporary Cement
- Step 107. Occlusal Adjustment
- Step 108. Wait up to one week in case of pain arising
- Step 109. If pain arises, apply Root Canal Treatment
- Step 110. If no pain arises, apply Anesthetic and Isolation
- Step 111. Removal of Cement and Sedative Paste
- Step 112. Application of Glass Ionomer
- Step 113. Occlusal Adjustment
- Step 114. Wait up to one month in case of pain arising
- Step 109. If pain arises, apply Root Canal Treatment
- Step 115. If no pain arises, apply Anesthetic and Isolation
- Step 116. Definitive Tooth Restoration
- Step 117. Control visit in three months to check for pain
- Step 109. If pain arises, apply Root Canal Treatment
- Step 118. If no pain arises, then control visits annually

METHOD FOR MITIGATING PULPAL PAIN IN SYMPTOMATIC PATIENTS AND PREVENTING UNNECESSARY ENDODONTIC TREATMENT

BACKGROUND OF THE INVENTION

1. Area of the Art

The present invention falls within the field of dentistry, specifically in the area of endodontic prevention, pulpal pain management, and preservation of dentin-pulp vitality. It is aimed at the conservative treatment of acute or chronic symptomatic conditions in teeth with still-vital pulps, with the goal of preventing the need for invasive endodontic procedures, avoiding unnecessary root canal treatments, or sacrificing pulpal vitality without proper justification. The invention offers a therapeutic alternative that enables the functional preservation of the dental organ in the oral cavity, avoiding radical interventions that may compromise its structural and biological integrity over time following various dental procedures.

2. Description of the Background Art

In clinical dental practice, pulpal inflammation represents a significant challenge for the conservative management of dental tissues. Symptomatic pulpitis, although not always indicative of irreversible pulpal damage, frequently leads to endodontic treatment due to the intensity of pain reported by patients. This clinical pattern has contributed to a widely adopted practice of performing root canal therapy in response to painful symptoms, even in cases where pulpal vitality could potentially be maintained through a biologically conservative approach.

Over time, various therapeutic strategies have been implemented to manage pulpal pain. Among the most common are systemic pharmacological approaches involving analgesics and anti-inflammatory agents. While these may provide temporary relief, they do not address the local inflammatory process nor promote true resolution of the underlying condition.

Other methods have included the local application of anti-inflammatory agents directly to the pulpal chamber or exposed dentin in an attempt to modulate the tissue response. Although such techniques may show efficacy in selected cases, their success depends heavily on the timing of application, control of microbial contamination, and the quality of the subsequent coronal seal.

In cases of severe pain, an emergency pulpal access procedure is often performed. While this intervention can alleviate intrapulpal pressure and provide immediate symptom relief, it exposes the pulp tissue to the oral environment. Without proper isolation, disinfection, and immediate restoration, this exposure can increase the risk of microbial invasion and accelerate pulpal degeneration, thereby reducing the likelihood of maintaining pulp vitality.

Attempts have also been made to preserve pulp tissue through partial pulpotomy or indirect pulp capping techniques in cases of carious or traumatic exposure. However, variability in case selection, the absence of standardized clinical protocols, and dependence on ideal clinical conditions have limited their widespread efficacy and predictability.

Numerous clinical and experimental studies have highlighted that long-term preservation of pulp vitality depends more on controlling bacterial load and minimizing irritative stimuli than on directly intervening in the pulp with invasive procedures. In this regard, successful outcomes rely on interventions that respect the biological environment of the tooth, ensure adequate sealing, and promote favorable tissue responses.

Despite these efforts, there is currently no standardized clinical method that, when applied in a timely manner, effectively mitigates symptomatic pulpal pain, prevents its progression to necrosis, and avoids unnecessary endodontic procedures, thus preserving the long-term vitality and function of the dental organ.

This clinical gap underscores the need for a structured, reproducible, and clinically feasible therapeutic protocol that integrates three essential pillars: infection control, immediate symptom relief, and stimulation of tissue recovery, all within a preventive and biologically respectful treatment framework.

SUMMARY OF THE INVENTION

The present invention provides a structured, evidence-based, and biologically respectful clinical protocol aimed at the conservative management of symptomatic vital pulp conditions in human teeth. It addresses the resolution of acute pulpal pain and the prevention of unnecessary endodontic interventions, particularly in cases where pulpal vitality remains intact despite the presence of significant symptomatology. By integrating contemporary understanding of pulp biology, inflammation control, microbial reduction, and restorative biomaterials, this method supports the preservation of the pulp-dentin complex and the long-term functional retention of the dental organ.

This protocol is especially suited for teeth diagnosed with reversible pulpitis or those presenting with deep carious lesions yet maintaining vitality. In routine clinical practice, such presentations often prompt root canal treatment based solely on the intensity of pain, overlooking the potential for biological recovery. This invention seeks to close this therapeutic gap by introducing a reproducible, stepwise clinical sequence that follows the principles of minimally invasive dentistry and modern vital pulp therapy.

The clinical method begins with a thorough diagnostic phase, including medical and dental history review, pulp vitality testing, and symptom analysis to determine pulpal status. Upon confirming the presence of a vital pulp and the potential for reversibility, the intervention proceeds with the administration of local anesthesia and isolation of the operative field using a rubber dam. This is followed by a conservative caries excavation strategy that emphasizes the complete removal of infected dentin while preserving affected dentin that retains the potential for remineralization. Such an approach minimizes unnecessary pulpal exposure and promotes biological healing.

After mechanical debridement, the internal surfaces of the cavity are disinfected with antimicrobial agents such as chlorhexidine or low-concentration sodium hypochlorite, ensuring the elimination of residual microbial biofilms while preserving tissue compatibility. In cases of deep cavities or controlled pulpal exposure, a biocompatible pulp-capping agent, either calcium hydroxide or mineral trioxide aggregate (MTA), is applied to induce dentin bridge formation and reduce inflammation. This capping layer is subsequently protected with a sedative zinc oxide-eugenol base, which acts as a chemical and thermal insulator and provides temporary analgesia through the pharmacologic action of eugenol.

A pre-formulated, moisture-setting temporary cement is then placed to ensure a hermetic coronal seal, essential for the success of the biological approach. A light occlusal adjustment is performed to prevent excessive mechanical stress on the treated tooth during the early healing phase. The patient is subsequently placed under clinical observation for one week to assess pulpal response. If pain persists or worsens during this period, conventional root canal therapy is initiated. Conversely, if the patient remains asymptomatic, a second session is scheduled for removal of the temporary materials and placement of a glass ionomer base. This material offers chemical adhesion, fluoride release, and biocompatibility, supporting continued pulp protection beneath the final restoration.

Definitive restorative treatment follows, tailored to the individual needs of the case and may include direct composite resins, indirect onlays, ceramic crowns, or amalgam. After placement, an occlusal equilibrium is ensured through careful adjustment. The protocol includes a one-month reassessment to confirm pulpal stability, followed by an additional session three months after initial treatment to evaluate long-term clinical success. If all parameters remain within normal limits, the tooth is considered biologically healed.

At this point, the patient transitions to an annual recall phase, during which clinical and radiographic evaluations are performed to confirm continued pulp vitality, restoration integrity, and functional stability. These follow-up visits are essential to detect any late-stage failure or changes in periapical status. Throughout the entire process, the patient is educated on recognizing signs of potential complications and advised to report any pain, sensitivity, or functional issues immediately.

This invention offers a novel, standardized approach to managing symptomatic yet vital teeth without defaulting to irreversible endodontic procedures. By focusing on pain control, microbial management, pulpal healing, and strategic follow-up, the protocol enables clinicians to shift from a reactive to a preventive model of care. It not only preserves biological function but also enhances patient outcomes by reducing overtreatment and promoting long-term dental organ preservation.

BRIEF DESCRIPTION OF THE DRAWINGS

FIG. 1 is a diagram of a method of the present invention.

DETAILED DESCRIPTION OF THE INVENTION

The following description is provided to enable any person skilled in the art to make and use the invention and sets forth the best mode contemplated by the inventor for carrying out the invention. Various modifications and clinical adaptations may be readily apparent to those skilled in the field of endodontics and restorative dentistry, since the general principles of the present invention are defined herein with the aim of establishing an improved biologically based clinical protocol for managing symptomatic dental conditions while preserving pulp vitality and avoiding unnecessary root canal therapy.

This invention was developed based on the inventor's accumulated clinical knowledge and experience, driven by the pressing need to relieve pulpal pain in symptomatic patients without sacrificing the vitality of the dental pulp. A primary motivation for the creation of this protocol was the observation that many patients experiencing severe dental pain were often subjected to irreversible endodontic treatment, despite presenting with vital pulps and reversible clinical conditions. In numerous cases, these patients also lacked the financial resources required to afford complex root canal procedures, resulting in deferred treatment, tooth loss, or worsening of symptoms. Recognizing the biological potential for pulp healing and regeneration when managed under appropriate clinical conditions, the inventor established a comprehensive, structured protocol that not only alleviates symptoms but also enables long-term preservation of the natural tooth.

This invention, titled "Method for Mitigating Pulpal Pain in Symptomatic Patients and Preventing Unnecessary Endodontic Treatment", integrates principles of modern vital pulp therapy, caries control, and biologically oriented restorative strategies to offer a feasible, cost-effective, and reproducible solution applicable to general practice and public health settings. The method has been successfully implemented in two clinical settings: a health unit in Ecuador, where it was applied to over 500 patients, and a private dental practice, where it was tested in 240 additional cases. In both populations, the protocol achieved an overall success rate greater than 90%, as defined by the absence of post-treatment pain, maintenance of pulp vitality, and functional retention of the affected tooth over time.

The protocol comprises a stepwise diagnostic and therapeutic sequence including clinical and radiographic assessment, selective caries removal, dentin-pulp protection, temporary sealing, symptom monitoring, and staged definitive restoration. The key to its success lies in the strategic use of minimally invasive techniques, biocompatible materials such as calcium hydroxide, mineral trioxide aggregate, and glass ionomer cement, and the meticulous maintenance of a hermetic coronal seal throughout the observation and healing periods. By integrating pulpal diagnostics with biologically sensitive intervention and systematic follow-up, the protocol offers a novel, patient-centered approach to dental care that prioritizes biological preservation, cost reduction, and clinical efficacy. The invention has proven to be especially valuable in underserved populations, where economic and logistical barriers often limit access to conventional endodontic treatment.

This detailed description will further elaborate on each procedural step, referencing evidence-based practices and aligning with contemporary diagnostic criteria such as those defined by the American Association of Endodontists, while demonstrating how the protocol can be implemented across a wide range of clinical contexts without compromising patient outcomes.

The basic steps of our method for mitigating pulpal pain in symptomatic patients and preventing unnecessary endodontic treatment are illustrated in FIG. 1.

Upon presentation to the dental clinic, the patient may arrive with active pain or may report no current pain but a recent history of pulpal symptoms, often described in colloquial terms as "a tooth that's been bothering me." Although most patients typically present with acute or lingering pain at the time of consultation, both scenarios are considered within the scope of this protocol. The patient is first seated comfortably in the dental chair, and a preliminary assessment of vital signs is performed to ensure general health stability. This is followed by the collection of detailed medical and dental history, including systemic conditions, medications, allergies, and familial health background relevant to the clinical decision-making process. An informed consent document is then carefully explained, signed, and included in the patient's clinical file. After documentation, the clinician conducts a focused interview to obtain a detailed account of the pain history, including onset, frequency, intensity, character (e.g., spontaneous or stimulus-induced), and any prior treatments attempted. A comprehensive intraoral examination follows, which includes visual inspection, palpation of soft and hard tissues, percussion, occlusal assessment, and periodontal probing where indicated. The dental crown is evaluated for signs of caries, defective restorations, fractures, or other irritants. To determine the status of the pulp, the affected tooth is subjected to pulp vitality testing, such as thermal testing (cold/hot), electric pulp testing, and response to mechanical stimuli. These tests help classify the pulpal condition as normal, reversible pulpitis, irreversible pulpitis, or necrotic, in accordance with current diagnostic standards. If the pulp is determined to be vital and the condition potentially reversible, the clinician proceeds with the conservative therapeutic intervention detailed in this method.

Following the diagnostic phase and treatment planning, we now refer again to FIG. 1. The first step 100 is the administration of local anesthesia to ensure patient comfort and to allow for a pain-free clinical intervention. The procedure begins with the application of a topical anesthetic (commonly in gel or spray form) to the mucosa at the site of intended needle insertion. This step is designed to reduce the discomfort associated with the penetration of the needle through the mucosal tissue. The selection of the type of local anesthesia depends on multiple clinical factors, including: the general health status of the patient (e.g., cardiovascular conditions, allergies, medications), the anticipated duration of the procedure, and the anatomical location of the tooth to be treated. For maxillary (upper) teeth, an infiltrative anesthesia technique is usually sufficient due to the porous nature of the maxillary bone, which allows for effective diffusion of the anesthetic agent. In contrast, for mandibular (lower) molars and premolars, where the bone is denser, a nerve block technique such as the inferior alveolar nerve block (IANB) is typically required to achieve adequate pulpal anesthesia. The most commonly used agents include articaine, lidocaine, or mepivacaine, with or without vasoconstrictors (e.g., epinephrine), depending on the patient's medical background and the duration required. The concentration and formulation are selected to balance onset time, duration, and systemic safety. After the anesthetic is administered, a waiting period of approximately 3 to 5 minutes for infiltration, or 5 to 10 minutes for block anesthesia, is observed to allow for the onset of full anesthetic effect. Clinical confirmation of anesthesia may include absence of response to cold testing or gentle probing of gingival tissues. While waiting for the anesthesia to take effect, the operator proceeds with the placement of rubber dam isolation, which is considered the gold standard in endodontics. The rubber dam provides a dry, aseptic field, protects the patient's airway, and prevents contamination of the operative site with saliva or microorganisms. This step is essential to ensure the success of the treatment and preservation of pulpal integrity, especially when aiming to avoid microbial infiltration during conservative vital pulp therapies. Correct placement includes selecting the appropriate clamp, ensuring proper seal of the dam material around the tooth, and verifying full isolation before proceeding to the intervention.

Once effective local anesthesia has been achieved, and rubber dam isolation is in place, at the next step 101, the procedure proceeds with the removal of carious tissue, using a conservative and biologically respectful approach based on the principles of selective caries excavation. The process begins with the complete removal of demineralized enamel, which is structurally compromised and no longer capable of fulfilling its protective or functional role. All undermined enamel must be eliminated to prevent future fracture or leakage. Following enamel removal, attention is directed toward the dentin. Here, it is essential to differentiate between infected dentin and affected dentin. Infected dentin is soft, necrotic, heavily contaminated with bacteria, and lacks the potential for remineralization. It must be completely removed using low-speed burs, excavators, or other minimally invasive rotary instruments. Affected dentin, on the other hand, is partially demineralized but retains structural collagen matrix integrity and may still be capable of remineralization. According to current evidence-based protocols, affected dentin should be preserved, particularly in deep lesions approaching the pulp, to avoid unnecessary exposure and to promote the maintenance of pulp vitality. The tactile feedback during excavation (soft vs. leathery vs. firm dentin), along with the use of magnification and caries-detecting methods when necessary, assists the clinician in distinguishing between tissue types. This selective removal strategy aims to eliminate the infectious component of the lesion while maintaining as much of the natural dentin as possible, thereby enhancing the chances of pulpal healing and long-term tooth survival.

The next step 102 involves the design of the cavity preparation, which should be guided by the principles of minimally invasive dentistry, preservation of sound tissue, and long-term structural integrity of the tooth. Modern cavities design no longer follows rigid geometric shapes but rather adapts to the extent and location of the carious lesion, with the primary goal of facilitating: complete removal of the infection, retention of the restoration, optimal marginal seal, and preservation of as much natural tooth structure as possible. The internal form of the cavity should allow for mechanical stability of restorative material while minimizing the risk of stress concentration on remaining dentin walls. Rounded internal line angles are recommended to reduce crack propagation and promote restorative adaptation. When deep lesions approach the pulp, the design must respect the proximity of the pulp chamber, avoiding unnecessary removal of dentin that could compromise vitality. In these cases, maintaining residual dentin thickness (RDT) is essential, as literature has shown that even 0.5 mm of dentin can significantly reduce pulpal inflammation from restorative procedures or materials. Peripheral enamel margins should be evaluated for integrity. Unsupported enamel should be removed to prevent future marginal breakdown, while sound enamel margins should be preserved to improve bonding and sealing. No additional extension of the cavity is performed beyond the margins of carious tissue, adhering to the concept of "extension for prevention" only when biomechanically or biologically justified. This biologically driven approach to cavity design creates a favorable environment for pulp recovery and supports the goal of this protocol: to eliminate pain, preserve pulp vitality, and avoid unnecessary endodontic intervention.

The next step 103 is the disinfection of the exposed dentin and internal surfaces of the cavity. This procedure is essential to reduce bacterial load, prevent microleakage, and create a biologically favorable environment for pulp healing and long-term success of the restoration. The disinfection protocol must be effective against residual microorganisms without causing cytotoxic effects on pulpal or dentinal tissues. The choice of agent should be guided by the lesion depth, the remaining dentin thickness, and the intended restorative procedure. The commonly used agents include i) chlorhexidine digluconate (0.12-2%), which provides a broad-spectrum antimicrobial effect and substantivity on dentin surfaces; ii) sodium hypochlorite (NaOCl) at low concentrations (0.5-1.0%) for superficial disinfection, though caution is advised near exposed pulp tissue due to its high alkalinity and potential cytotoxicity; and iii) polyhexamethylene biguanide (PHMB); or other biocompatible antiseptics may also be used, particularly in biologically oriented protocols. In vital pulp therapy or deep cavities where pulp preservation is the objective, gentle irrigation or active wiping with cotton pellets soaked in the selected disinfectant is performed, ensuring no pressure or mechanical irritation is applied to the dentinal floor. The disinfection time typically ranges from 30 seconds to 2 minutes, depending on the agent used, followed by gentle drying with sterile air or blotting, avoiding desiccation, which can dehydrate dentin and compromise pulp vitality. Proper disinfection is critical to eliminate residual bacterial biofilm and endotoxins that may persist after mechanical excavation. This step significantly enhances the success of pulp-preserving procedures and minimizes the risk of postoperative hypersensitivity, inflammation, or failure.

The next step 104 involves the application of a protective pulp-capping material, particularly in deep cavities where the remaining dentin thickness is minimal, or where a pinpoint exposure of the pulp may have occurred under controlled conditions. The objective at this stage is to provide a biocompatible interface between the restorative material and the underlying pulp tissue, promoting healing, reducing inflammation, and stimulating the formation of reparative dentin. The choice of pulp-capping agent depends on clinical factors such as material availability, operator preference, and pulpal status. Two well-established options are commonly used in clinical endodontics and vital pulp therapy.

Option 1: Calcium Hydroxide has long been considered the gold standard for direct and indirect pulp capping. It exerts a highly alkaline pH (~12.5), which promotes antimicrobial activity and induces mineralized tissue formation by stimulating odontoblastic differentiation. Recommended when the pulp is vital, the exposure is minimal (mechanical or carious under control), and a reparative response is desired. We apply a thin layer (≤1 mm) of calcium hydroxide paste or hard-setting formulation is placed directly over the deepest area of dentin or small pulpal exposure.

Option 2: Mineral Trioxide Aggregate (MTA) is a bioactive, hydrophilic calcium silicate cement that offers superior biocompatibility, excellent sealing ability, and long-term stability. It has become widely accepted in vital pulp therapy, particularly in young permanent teeth or cases requiring durable pulpal protection. Ideal for deep indirect pulp capping and direct pulp capping, especially in cases of reversible pulpitis or iatrogenic exposure. We apply a small amount of MTA is mixed according to manufacturer instructions and placed gently over the site using a sterile instrument. A thickness of approximately 1.5-3 mm is recommended to ensure adequate sealing and bioactivity.

The next step 105 consists of the application of a sedative base, intended to further soothe or relieve the pulpal pain, reinforce the underlying capping agent, and provide an intermediate barrier prior to definitive restoration. The sedative base used in this protocol is a custom-formulated zinc oxide-eugenol paste.

An expression of this sedative paste is represented by the following formula:

$$\text{Sedative } B \text{ g } (ZnO) + 0.75(B) \text{ ml } (C_{10}H_{12}O_2) \quad \text{[Eq. 1]}$$
$$\text{Paste} = \text{Powder Base } oil \text{ phase}$$

Wherein: B is an integer representing an amount or quantity of chemical component to be used per tooth; g represents grams unit; ZnO represents Zinc Oxide; ml represents milliliters; $C_{10}H_{12}O_2$ represents Eugenol.

Zinc Oxide (ZnO): Acts as the powder base; provides antimicrobial and structural bulk. Eugenol ($C_{10}H_{12}O_2$): Acts as the oil phase; a phenolic compound derived from clove oil, with known analgesic, anti-inflammatory, and antiseptic properties.

When combined, ZnO reacts with eugenol to form zinc eugenolate, a chelate matrix that hardens over time and creates a sedative, biologically compatible base. The ratio of the components for the sedative paste illustrated in the Eq. 1 corresponds to approximately 1.00:0.75 (w/w or g/g), yielding a paste with a smooth, creamy consistency ideal for intracavitary application proportion to be used per single patient.

The paste is prepared freshly on a sterile mixing pad using a stainless-steel spatula, ensuring a homogenous mixture. Using a suitable applicator (e.g., ball burnisher, carrier), the paste is placed directly over the pulp protection material, without disturbing its position. The thickness of application varies depending on the available cavity space and depth: a minimum of 1.0 mm is sufficient to cover and protect the base and maximum of 2.5 mm may be used when the cavity allows more vertical room. Once placed, the sedative layer provides thermal insulation from external stimuli, chemical protection over the pulp-capping agent, short-term analgesia through the action of eugenol, and biological compatibility with the underlying tissues.

At the next step 106, a temporary sealing material is applied to the coronal portion of the cavity to ensure a tight and effective seal of the underlying therapeutic layers. This material is a pre-formulated, eugenol-free, hygroscopic temporary cement composed primarily of zinc oxide, inert fillers, and plasticizers that harden in the presence of oral moisture. Its physical properties allow for excellent marginal adaptation through slight expansion upon setting, ensuring microbial and salivary leakage is effectively prevented. It is ready to use, does not require mixing, and presents a smooth, moldable consistency that facilitates insertion and adaptation with minimal instrumentation. A minimum thickness of 3 to 4 mm is recommended to ensure mechanical resistance and functional durability. Importantly, this cement is intended only as a temporary occlusal seal, to be placed for the purpose of protecting the pulp and therapeutic materials during the interim period, until a definitive restoration can be provided. Its role is critical in this protocol, as a hermetic coronal seal is essential for maintaining the sterility of the cavity, supporting pulp healing, and ensuring the overall success of the conservative treatment. Then, we proceed to remove the rubber dam.

At the next step 107, the patient is instructed to gently close into centric occlusion, and articulating paper is used to identify premature contacts or high spots on the provisional surface. Any excessive occlusal load on the treated tooth could lead to postoperative discomfort, microleakage, or even disruption of the pulp-protective layers, compromising the success of the biologically conservative approach. If any high points are detected, they are gently adjusted using a fine-grit polishing bur, taking care not to fracture or displace the temporary restoration. The goal is to achieve light, passive occlusal contact, or even slight occlusal relief, on the treated tooth, especially in cases of recent pain or deep pulpal inflammation.

At the next step 108, the patient is instructed to enter a short-term observation period of approximately one week, during which the tooth's pulpal response and the resolution of symptoms will be monitored. The purpose of this interval is to assess the presence or absence of pain, which serves as a clinical indicator of either pulpal recovery or potential deterioration. The patient is advised that mild to moderate discomfort may be expected during the first 24 to 48 hours, particularly in previously symptomatic cases. To manage this, the use of a non-steroidal anti-inflammatory drug (NSAID) or analgesic is recommended for one to two days, depending on the patient's symptom intensity and individual tolerance. The clinician should select or suggest the most appropriate medication based on the patient's medical history, allergies, and contraindications. Importantly, the patient is clearly informed that if intense, spontaneous, or persistent pain occurs, especially if it interferes with sleep or daily activities, they must return to the clinic immediately for revaluation. Such symptoms may indicate pulpal deterioration or failure of the conservative approach, and prompt intervention will be necessary. During this period, the patient is also instructed to be extremely cautious with the treated tooth: they should avoid chewing on that side, especially hard or sticky foods, to prevent mechanical disruption of the provisional restoration. It is critical that the temporary seal remains intact, as the success of the treatment relies heavily on maintaining a hermetic coronal seal that protects the pulp and the underlying therapeutic materials from microbial contamination. This monitoring phase is essential to ensure that the conservative treatment is progressing as expected. A complete absence of pain or significant symptom reduction during this week is considered a positive sign of pulpal healing, reinforcing the decision to avoid invasive endodontic therapy.

At the next step 109, if the patient reports persistent, spontaneous, or intensifying pain during the observation period, or even before the scheduled one-week follow-up, this is considered a clinical sign of irreversible pulpal inflammation, indicating that the symptomatic tooth must be reevaluated clinically and radiographically, confirming the persistence of pain and ruling out other potential causes such as occlusal trauma, restoration dislodgment, or periodontal involvement. If the findings support pulpal degeneration, root canal therapy (RCT) is indicated and should be initiated without delay to eliminate the source of infection and alleviate the patient's discomfort.

At the next step 110, after the one-week observation period, if the patient reports no pain or discomfort, this is interpreted as a favorable pulpal response, indicating that the conservative treatment has been successful in controlling inflammation and preserving pulp vitality. In such cases, the protocol proceeds to the second clinical session. The second appointment begins with the recording of vital signs, as per standard clinical protocol, to confirm the patient's systemic stability. This is followed by a brief update of the medical and dental history, and the review and signing of a new informed consent, specifically covering the procedures planned for this visit. The patient is then prepared for treatment, and the appropriate local anesthesia is administered, selected according to the tooth being treated, the anticipated depth of intervention, and the patient's overall health status. Then, absolute isolation using a rubber dam to ensure a clean, dry, and aseptic working field. This step is critical to prevent salivary contamination of the restoration site and to preserve the biological success achieved in the first appointment.

At the next step 111, the procedure continues with the careful removal of the temporary cement and the sedative base placed during the first session. The temporary restorative material, designed to be easily dislodged, is gently removed using hand instruments such as an excavator or spoon, or with a low-speed rotary instrument, applying minimal pressure to avoid heat generation or unnecessary vibration. After lifting the superficial seal, the clinician proceeds to eliminate the underlying sedative paste, taking care not to disturb or damage the pulp-capping material beneath. This step must be performed delicately to maintain the integrity of the biologically active layer, whether it is calcium hydroxide or MTA, both of which require mechanical stability and aseptic conditions to support pulp healing. During removal, the operator assesses the clinical appearance of the cavity, verifying the absence of exudate, odor, discoloration, or material breakdown, all of which could indicate pulpal deterioration or contamination. If the pulp-capping agent remains well-adapted and undisturbed, and the dentin presents as firm and clean, the case is considered ready to proceed to definitive restoration. This phase is essential not only for transitioning to the final restoration but also as a clinical checkpoint to validate the success of the conservative treatment, in accordance with biological and evidence-based endodontic protocols.

The next step 112 consists of the placement of a glass ionomer cement (GIC) as the restorative material. This material is selected for its unique combination of chemical adhesion, biocompatibility, fluoride release, and favorable behavior in deep dentin areas and biologically sensitive situations. The cavity is first cleaned with gentle air-water spray and dried with cotton pellets or gentle air flow, avoiding over-drying of dentin, which can negatively affect bonding and pulpal health. No acid etching is required when using conventional or high-viscosity glass ionomer materials, as these materials chemically bond to both enamel and dentin through ionic interaction with calcium ions in hydroxyapatite. The GIC is prepared according to manufacturer instructions, typically involving the mixing of a powder-liquid system or activation of a pre-dosed capsule. Once mixed, the material is quickly inserted into the cavity using a plastic filling instrument, adapted to the cavity margins, and pressed gently against the cavity walls to ensure intimate contact and marginal seal. After initial setting (usually 2-4 minutes), excess material is trimmed, and the surface is coated with a protective resin or varnish if indicated, to prevent dehydration or contamination during the final stages of setting. Glass ionomer cements offer several clinical advantages in this context such as chemical adhesion to enamel and dentin without the need for aggressive surface preparation, fluoride release, which may contribute to antibacterial activity and remineralization of surrounding tooth structure, thermal compatibility with dentin, reducing the risk of post-operative sensitivity, and excellent marginal adaptation, which contributes to long-term seal and protection of the underlying pulp-capping materials. In biologically oriented restorative protocols, especially in cases of conservative vital pulp therapy, GIC serves not only as a restorative material but also as a biological sealant, reinforcing the principles of minimal intervention and supporting long-term pulp preservation. Then, we proceed to remove the rubber dam.

At the next step 113, a careful occlusal adjustment is performed to ensure that the restored tooth does not interfere with normal mandibular function. Articulating paper is used to identify any premature contacts or high spots. These are gently adjusted using fine finishing burs, taking care to maintain the integrity of the margins and avoiding excessive reduction of the restorative material. In cases of recent pulpal inflammation or deep cavities, light occlusal contact or slight relief is often recommended to minimize mechanical stress on the healing pulp. This step is essential to prevent postoperative sensitivity, promote patient comfort, and contribute to the long-term success of biologically conservative treatment.

At the next step 114, the patient is informed that a follow-up evaluation will be scheduled approximately one month later. This observation period is intended to allow sufficient time for the pulpal and periradicular tissues to stabilize, and to confirm the absence or persistence of symptoms before proceeding with the final restoration. During this month, the restorative material serves as a provisional seal and biologically compatible barrier, protecting the pulp and supporting the healing process. The clinician instructs the patient to monitor the treated tooth and report any signs of spontaneous pain, sensitivity, swelling, or discomfort, especially if symptoms intensify or reappear during normal function. Importantly, the patient is clearly advised that if pain, discomfort, or any unusual symptoms occur at any point during this waiting period, they must return to the clinic immediately for reevaluation. Early detection of pulpal deterioration or failure of the protective barrier is essential to determine if intervention is needed. This delayed follow-up is critical to determine whether the pulp has responded favorably to the treatment. According to evidence-based clinical protocols, the absence of symptoms, particularly the lack of pain and normal function without discomfort, strongly indicates that tissue recovery is progressing successfully, and that the vital pulp has been preserved.

At the conclusion of the one-month observation period, or earlier if the patient experiences pain, the clinician must assess the clinical outcome of the conservative treatment. If the patient reports spontaneous, persistent, or increasing pain at any point during the observation phase, the case is considered to have failed biological response, and the protocol returns to Step 109, where root canal therapy must be initiated to eliminate infection and preserve the tooth. However, if after the one-month period the patient remains asymptomatic, with no signs of pain, sensitivity, or clinical complications, the case is considered successful.

In the next step 115, the protocol advances to the third and final clinical session. This third session follows a similar workflow as previous appointments. It begins with the recording of vital signs, followed by review and update of the medical and dental history, and the signing of an informed consent form specific to the definitive procedure. The patient is then prepared for treatment. Local anesthesia is administered based on the tooth location and planned intervention, ensuring full patient comfort and operative control. Then, the clinical area is isolated using absolute isolation with a rubber dam. A clinical examination is performed to assess the integrity of the provisional restoration and the condition of the tooth. If necessary, a radiographic image may be taken to confirm pulpal stability and the absence of periapical pathology.

At the next step 116, the procedure continues with the preparation of the tooth for the definitive restoration. The previously placed glass ionomer, which has served as a provisional restorative and biological seal, is partially reduced, leaving a residual base layer of approximately 1 to 2 mm in thickness. The remaining thickness depends on the size and depth of the cavity, and its role is to continue providing fluoride release, internal sealing, and pulpal protection beneath the final restorative material. Once the base is properly contoured and cleaned, the clinician proceeds with the placement of the definitive restoration to protect the underlying biologically active materials and restore function and occlusal integrity, selected according to the clinical case, functional demands, esthetic considerations, and patient-specific factors. Accepted options include composite resin restorations, ideal for esthetic areas and minimally invasive cavities. Full-coverage indirect restorations such as ceramic or zirconia crowns, when structural integrity is compromised, or extensive coronal loss is present. Onlays or overlays using indirect materials, for cusp coverage and reinforcement. Amalgam restorations, though less commonly used today, remain an option in posterior load-bearing areas under specific conditions. The choice of restorative material is left to the discretion of the clinician, who must consider both the biological history of the tooth and the functional and esthetic needs of the patient. Once the restoration is placed and properly finished, a final occlusal adjustment is performed. This step ensures that the tooth does not exhibit premature contacts or excessive load during function, particularly important in previously symptomatic cases or those with a history of pulpal inflammation. Proper occlusal equilibration supports patient comfort, restoration longevity, and the long-term success of the biologically conservative treatment.

In the next step 117, the patient is informed that a follow-up clinical evaluation will be scheduled approximately three months later. The purpose of this extended observation period is to assess the long-term pulpal response and to confirm the continued absence of pain or other symptoms, which are essential indicators of the biological success of the conservative treatment. During this interval, the patient is advised to monitor the restored tooth closely and to report any signs of spontaneous pain, hypersensitivity, swelling, or discomfort during chewing or at rest. Although the three-month evaluation serves as the formal reassessment point, the patient is explicitly instructed that if pain or any unusual symptoms occur at any time before this visit, they must return to the clinic immediately for clinical evaluation.

If, upon reevaluation, signs of pulpal failure or irreversible inflammation are detected, the protocol must be reentered at Step 109, initiating root canal therapy to eliminate the source of pathology and preserve the tooth structurally. This careful monitoring phase is critical to confirm that the pulp remains vital and symptom-free, thereby consolidating the long-term success of the biologically based, conservative approach. At the three-month appointment, a thorough clinical examination will be performed, and radiographic imaging may be indicated to assess the periapical status, integrity of the restoration, and continued pulp vitality, particularly in cases involving deep carious lesions or previous symptomatology. This final follow-up point helps validate the long-term success of the biologically based protocol and provides a foundation for transitioning the patient to routine maintenance and preventive care.

At the next step 118, following the three-month clinical evaluation, if the patient continues to exhibit complete absence of pain, sensitivity, or any other symptoms, and all clinical and radiographic findings remain within normal limits, the treatment is considered biologically successful. In such cases, the patient transitions into a long-term maintenance phase, which includes annual follow-up appointments as part of routine dental care. The purpose of the annual follow-up is to monitor the long-term stability of the pulp, the integrity of the definitive restoration, and to detect any early signs of structural or biological compromise. These visits typically include a thorough clinical examination of the treated tooth and surrounding structures, pulp vitality tests, if indicated, to ensure the continued function of the pulp-dentin complex, percussion and palpation to assess periapical status, and radiographic imaging, particularly in cases where the lesion was initially deep, or the tooth presented with significant symptoms before treatment. The patient is instructed to maintain good oral hygiene and to report immediately if any new symptoms such as pain, swelling, or discomfort arise between scheduled visits. If the tooth remains asymptomatic and functionally stable, no further intervention is required beyond routine monitoring. This final step ensures that the biological objectives of the protocol are maintained over time, confirming that the conservative management strategy has achieved both functional preservation and pulpal health in the long term.

The following claims are intended to encompass not only the embodiments explicitly illustrated and described herein, but also their conceptual equivalents, any obvious substitutions, and all implementations that incorporate the fundamental principles of the invention. Professionals in the field will recognize that various modifications and alternative configurations can be developed without departing from the spirit or scope of the invention. The embodiment presented serves purely as an illustrative example and should not be interpreted as a limitation. Accordingly, it is understood that the invention may be applied in forms other than those specifically detailed, provided they fall within the scope of the appended claims.

What is claimed:

1. A method for mitigating pulpal pain in a symptomatic patient, comprising:
    applying anesthetic on a mucosal tissue of an affected tooth of the symptomatic patient,
    isolating the mucosal tissue from the affected tooth by placing a rubber dam on the affected tooth to protect the airway of the patient and prevent contamination of the affected tooth from microorganisms;
    removing carious tissue from the affected tooth;
    designing a proper sterile cavity in the affected tooth, to receive a restorative material, by completely removing all carious infection, preserving tooth structure, allowing mechanical retention of the restorative material, and rounding internal line angles;
    applying, using a sterile dental instrument, a protective material at the bottom of the designed proper sterile cavity, to protect the dental pulp of the affected tooth;
    applying, using a ball burnisher, a sedative paste to relieve pulpal pain,
    wherein the sedative paste is a paste consisting of a first chemical component and a second chemical component, i) the first chemical component having antimicrobial properties, ii) the second chemical component having analgesic, anti-inflammatory and antiseptic properties, and iii) the first and second chemical components are freshly and homogenously mixed just prior to being applied directly over the protective material without disturbing the position of the protective material;
    applying a temporary occlusal sealing material to the coronal portion of the designed proper sterile cavity to ensure a hermetically-tight and effective seal of the underlying layers including the dental pulp;
    removing the temporary occlusal sealing material and the sedative paste, after a healing phase resulting in an asymptomatic pain condition of the dental pulp; followed by
    applying a glass ionomer directly over the protective material,
    wherein the glass ionomer has a combination of good chemical adhesion to the protective material, good biocompatibility with the affected tooth, and continued fluoride release; and
    restoring functionality and occlusal integrity of the affected tooth by applying a restorative material consisting essentially of at least one of direct composite resins, indirect onlays, ceramic crowns, and amalgam, or a combination thereof,
    wherein the protective material comprises calcium hydroxide and/or mineral trioxide aggregate (MTA),
    wherein the temporary occlusal sealing material is a pre-formulated, eugenol-free, hygroscopic temporary cement consisting essentially of zinc oxide, inert fillers and plasticizers that harden in the presence of oral moisture,
    wherein i) the first chemical component of the sedative paste is zinc oxide, ii) the second chemical component of the sedative paste is eugenol, and iii) the first and second chemical components are applied according to the following equation:

$$\text{Sedative Paste} = B \text{ g } (ZnO) + 0.75(B) \text{ ml } (C_{10}H_{12}O_2);$$

wherein: B is an integer representing a quantity of chemical component to be used per tooth; g represents grams unit; ZnO represents Zinc Oxide; ml represents milliliters unit; and $C_{10}H_{12}O_2$ represents Eugenol.

2. The method for mitigating the pulpal pain in the symptomatic patient according to claim 1, wherein the glass ionomer is a biological sealant.

3. A method for mitigating pulpal pain in a symptomatic patient, comprising:
    applying, using a sterile dental instrument, a protective material to internal surfaces of a sterile cavity formed in an affected tooth of the symptomatic patient, where the sterile cavity has been engineered to allow mechanical retention of a restorative material, and rounding internal line angles, to protect the dental pulp of the affected tooth,
    wherein the protective material comprises calcium hydroxide and/or mineral trioxide aggregate (MTA);
    applying, using a suitable applicator, a sedative paste to relieve pulpal pain, wherein the components of the sedative paste are freshly and homogenously mixed just prior to the sedative paste being applied directly over the protective material without disturbing the position of the protective material,
    wherein the sedative paste consists of a first chemical component and a second chemical component, i) the first chemical component having antimicrobial properties, and ii) the second chemical component having analgesic, anti-inflammatory and antiseptic properties;
    applying a temporary occlusal sealing material to the coronal portion of the sterile cavity to ensure a hermetically-tight and effective seal of the underlying layers, including the dental pulp;
    removing the temporary occlusal sealing material and the sedative paste, after a healing phase resulting in an asymptomatic pain condition of the dental pulp; followed by
    applying a glass ionomer directly over the protective material,
    wherein the glass ionomer has a combination of good chemical adhesion to the protective material, good biocompatibility with the affected tooth, and continued fluoride release;

wherein the temporary occlusal sealing material is a pre-formulated, eugenol-free, hygroscopic temporary cement consisting essentially of zinc oxide, inert fillers and plasticizers that harden in the presence of oral moisture, wherein i) the first chemical component of the sedative paste is zinc oxide, ii) the second chemical component of the sedative paste is eugenol, and iii) the first and second chemical components are applied according to the following equation:

$$\text{Sedative Paste} = B \, g \, (ZnO) + 0.75(B) \, ml \, (C_{10}H_{12}O_2);$$

wherein: B is an integer representing a quantity of chemical component to be used per tooth; g represents grams unit; ZnO represents Zinc Oxide; ml represents milliliters unit; and $C_{10}H_{12}O_2$ represents Eugenol.

* * * * *